United States Patent
Lim (10) Patent No.: US 8,130,322 B2
(45) Date of Patent: Mar. 6, 2012

(54) METHOD OF PICTURE CONTROL AND IMAGE PROCESSING APPARATUS THEREOF

(75) Inventor: Boo-taeck Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1526 days.

(21) Appl. No.: 11/589,202

(22) Filed: Oct. 30, 2006

(65) Prior Publication Data

US 2007/0195200 A1    Aug. 23, 2007

(30) Foreign Application Priority Data

Feb. 23, 2006    (KR) .................. 10-2006-0017666

(51) Int. Cl.
- H04N 5/44 (2006.01)
- H04N 3/27 (2006.01)
- H04N 5/57 (2006.01)

(52) U.S. Cl. ........ 348/553; 348/554; 348/571; 348/686; 348/687

(58) Field of Classification Search .................. 348/553, 348/554, 558, 559, 581, 582, 725, 625, 686–688, 348/180, 184, 189, 571; H04N 5/44, 3/27, H04N 5/21, 5/57, 5/46, 9/74

See application file for complete search history.

(56) References Cited

U.S. PATENT DOCUMENTS

| 4,837,626 A * | 6/1989 | Nishiyama et al. ........... 348/554 |
| 2003/0043296 A1 | 3/2003 | Nierzwick et al. |

FOREIGN PATENT DOCUMENTS

| JP | 11-32279 A | 2/1999 |
| JP | 2000-284770 A | 10/2000 |
| JP | 2001-197397 A | 7/2001 |
| JP | 2002-33975 A | 1/2002 |
| KR | 1995-022946 A | 7/1995 |
| KR | 10-0129967 B1 | 11/1997 |
| KR | 10-0313863 B1 | 10/2001 |
| KR | 2003-0065946 A | 8/2003 |

* cited by examiner

Primary Examiner — Sherrie Hsia
(74) Attorney, Agent, or Firm — Sughrue Mion, PLLC (57) ABSTRACT

A picture control method and an image processing apparatus thereof are provided. The method includes setting a picture control mode; setting a picture control value in response to the picture control mode; and sensing a change of the picture control value; restoring the picture control value to a previous value if the change of the picture control value is maintained in excess of a certain amount of time. The image processing apparatus includes a picture controller which sets a mode and a value in response to the mode; a memory which stores an initial value of the value; and a controller which senses a change of the value and controls the picture controller to maintain the change of the value for a certain amount of time, and if the change of the value is maintained in excess of the certain amount of time, retrieves the initial value of the value, and controls the picture controller to change the picture control value to a previously unchanged value.

30 Claims, 5 Drawing Sheets

METHOD OF PICTURE CONTROL AND IMAGE PROCESSING APPARATUS THEREOF

CROSS-REFERENCE TO RELATED APPLICATION

This application claims priority from Korean Patent Application No. 10-2006-0017666 filed on Feb. 23, 2006, in the Korean Intellectual Property Office, the entire disclosure of which is hereby incorporated by reference.

BACKGROUND OF THE INVENTION

1. Field of the Invention

Apparatuses and methods consistent with the present invention relate to controlling a picture, and more particularly, to controlling a picture to improve the convenience for a user.

2. Description of the Related Art

An image processing device receives a video signal and an audio signal to display an image corresponding to the video signal and output an audio corresponding to the audio signal. The image processing device may include a display (e.g., a television) and a computer, and the video signal and the audio signal may be received through a broadcasting signal.

The image processing device has a picture control function that controls an image quality. The picture control function sets a contrast ratio of an image, a picture size, a luminance, a color, and other such parameters relating to image quality.

Each item for controlling picture has a respective initial value that is set differently depending on a control mode. The control mode sets values of picture control items so that an image can be displayed adaptively to a user's demand. In other words, an image processing device displays an image not according to a fixed format but according to various formats depending on a user's demand. The control mode includes a dynamic mode and a standard mode. The dynamic mode sets picture control items so that an image can be optimally displayed when an image processing device is manufactured. The standard mode sets picture control items so that an image can be displayed in a standard status.

The picture control items have initial values set corresponding to each control mode. The picture control items may be set to an arbitrary value by a user's input after the initial value is set. If the picture control item value is changed, the image processing device displays an image corresponding to the changed picture control value.

Thus, the picture control items may be controlled by a user's input. However, an image processing device exhibited in a public place such as a store or an exhibition hall should always keep a certain specified control mode so that an image can be displayed in a proper format for the purpose of use of the image in the store or exhibition hall. Especially, the image processing device of a store, which sells the image processing device, should keep an optimal display characteristic so that the value and quality of the image processing device can be maximally shown.

However, since the public place is used by many unspecified persons, the unspecified persons may arbitrarily change the control mode of the image processing device or change the picture control item values. While it is not desirable for a user to change these modes and values long-term, it is desirable that a user should be able to arbitrarily set the picture control items and test various display characteristics of the image processing device in order for a user to be able to select an image processing device which is proper to purchase condition. In any event, since the public place is used by many users, the picture control item of the image processing device may be changed at any time.

However, in this case, the image processing device can not maintain an optimal image quality, and therefore, a user can not accurately determine the display characteristics of the image processing device.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. An exemplary embodiment of the present invention provides a picture control method that controls a picture control value to be adapted for a display environment so as to improve the convenience for a user.

Another exemplary embodiment of the present invention provides an image processing apparatus performing the picture control method.

According to an aspect of the present invention, there is provided a picture control method including setting a picture control mode, setting a picture control value in response to the picture control mode, sensing a change of the picture control value, and restoring the picture control value to a previously unchanged value if the changed picture control value is maintained in excess of a certain amount of time.

The picture control mode may be set to adjust a quality of the image, and the picture control value may be set to adjust a display status of the image in response to the picture control mode.

Restoring the picture control value may comprise determining whether the picture control mode is set to maintain an initial value of the picture control value, if the picture control value is changed, maintaining the changed picture control value for the certain amount of time, if the picture control mode is set to maintain an initial value of the picture control value, initializing the picture control value in response to the picture control mode set, if the picture control value is maintained in excess of the time unit, and maintaining the changed picture control value, if the picture control mode is set to maintain the changed picture control value.

The picture control value may have an initial value that is set differently depending on a kind of the picture control mode.

The setting of the picture control mode may include setting a main control, and setting a sub control mode.

The main control mode may be set to determine whether the picture control value is initialized, and the sub control mode may be set to set a quality of the image.

The restoring the picture control value may include determining whether the main control mode is a first main mode, if the picture control value is changed, maintaining the changed picture control value for the certain amount of time, if the main control mode is the first main mode, initializing the picture control value in response to the sub control mode, if the picture control value is maintained in excess of the certain amount of time, and maintaining the changed picture control value, if the main control mode is not the first main mode.

The picture control value may have an initial value that is set depending on a kind of the sub control mode.

The method may further comprise sensing whether the sub control mode is changed, determining whether the present main control mode is a first main mode, if the sub control mode is changed, maintaining the changed sub control mode for the certain amount of time, if the main control mode is the first main mode, changing the sub control mode to a previously unchanged mode, if the changed sub control mode is maintained in excess of the certain amount of time, and maintaining the changed picture control mode, if the main control mode is not the first main mode.

The picture control value may comprise at least one of a picture size, a contrast ratio, and a luminance.

The picture control value may be initialized to an initial value that is set at a time of manufacturing of an apparatus.

According to another aspect of the present invention, there is provided an image processing apparatus including a display which displays an image, a picture controller which sets a picture control mode, and sets a picture control value in response to the picture control mode, a memory which stores an initial value of the picture control value in response to the picture control mode, and a controller which senses a change of the picture control value and controls the picture controller to maintain the change of the picture control value for a certain amount of time, and if the change of the picture control value is maintained in excess of the certain amount of time, retrieves an initial value of the picture control value, which corresponds to the picture control mode, from the memory to provide to the picture controller, and controls the picture controller to change the picture control value to a previously unchanged value.

The picture control mode may be set to set a display scheme of the image, and the picture control value may be set to set a quality of the image.

The memory may store an initial value of the picture control value in response to a kind of the picture control mode.

The picture control value may be initialized to an initial value that is set at a time of manufacturing of the apparatus.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Exemplary embodiments of the present invention will be described in detail with reference to the appended drawings. In the drawings, the same elements are denoted by the same reference numerals throughout the drawings. In the following description, detailed descriptions of known functions and configurations incorporated herein have been omitted for conciseness and clarity.

Figure 1:
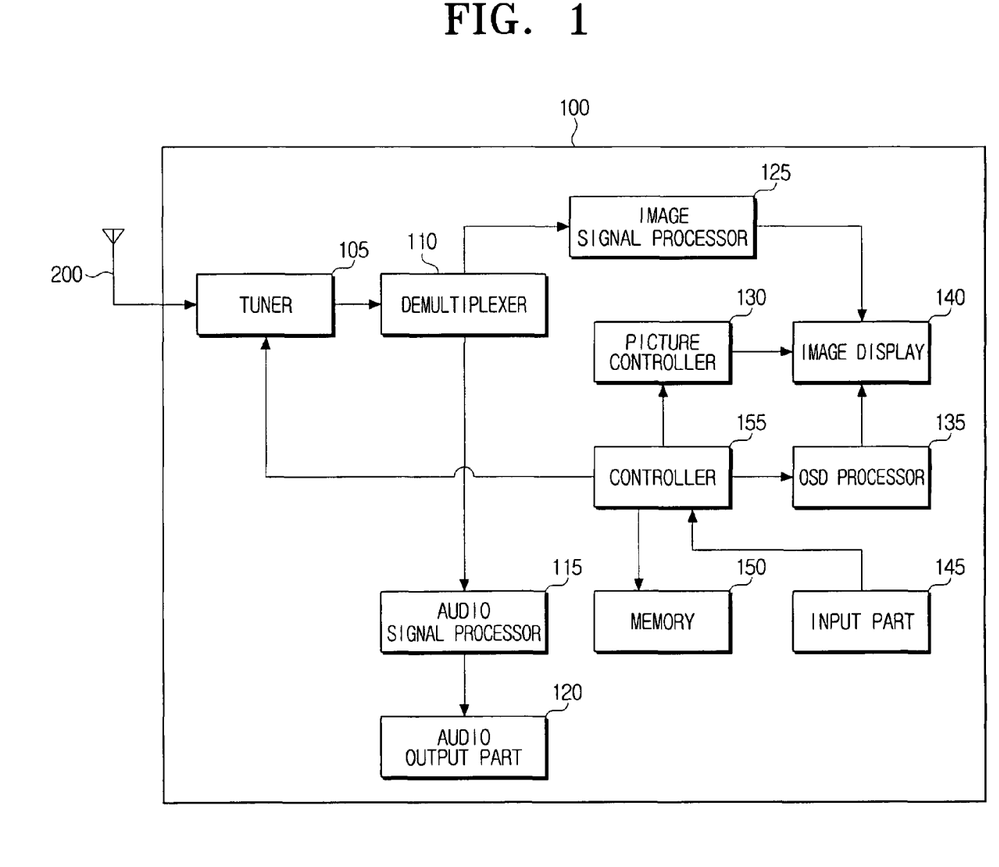
FIG. 1 is a block diagram of an image processing apparatus according to an exemplary embodiment of the present invention.

FIG. 1 is a block diagram of an image processing apparatus according to an exemplary embodiment of the present invention.

Referring to FIG. 1, an image processing apparatus 100 consistent with an exemplary embodiment of the present invention comprises a tuner 105, a demultiplexer 110, an audio signal processor 115, an audio output part 120, an image signal processor 125, a picture controller 130, an on screen display (OSD) processor 135, an image display 140, an input part 145, a memory 150 and a controller 155. By way of example, the image processing apparatus 100 may be a television.

In detail, the tuner 105 sets a channel, which may be set arbitrarily, among a plurality of channels to an input channel and receives a broadcast signal of the input channel from an antenna 200 to provide the signal to the demultiplexer 110. The antenna may be external.

The demultiplexer 110 splits the broadcast signal received from the tuner 105 into a video signal and an audio signal and provides the audio signal to the audio signal processor 115 and the video signal to the image signal processor 125, respectively.

The audio signal processor 115 decodes the audio signal and provides the decoded audio signal to the audio output part 120, and the audio output part 120 outputs an audio corresponding to the audio signal.

The image signal processor 125 decodes the video signal and provides the decoded video signal to the image display 140.

The picture controller 130 sets a picture control value to control the image quality of the image display 140, that is, the display of the image. The picture control value controls a picture size, a contrast ratio, a noise ratio, a picture in picture (PIP) on/off, a luminance, a color weakness mode, a film mode, a tuner sensitivity, and other similar image quality values.

The picture controller 130 sets an initial value of the picture control value corresponding to the picture control mode that displays a same image in various formats under the control of the controller 155. The picture control mode controls the picture control value so that a same image can be displayed differently depending on the current setting of the picture control mode. In other words, each picture control value is set differently depending on each picture control mode so that a picture can be differently displayed. The picture control value has an initial value which may be set corresponding to each picture control mode, or set by an input from a user.

In an exemplary embodiment of the present exemplary embodiment, there are eight picture control modes that are the first picture control mode through the eighth picture control mode. However, it is possible to have more or less than this number of picture control modes. That is, the kind of the picture control mode may be reduced or increased depending on the function of the image processing apparatus 100 and the manufacturer's purpose, and may be configured in various ways.

The first through fourth control modes are initial modes to always maintain the initial value, and the fifth through eighth modes are change modes to maintain the changed value when the picture control value is changed by a user's input. The change by the user's input may be to an arbitrary value. Thus, the first through fourth control modes initialize the picture control value to a certain value, which may be predetermined, and when the picture control value is changed by a user's input, the first through fourth control modes maintain the changed picture control value for a certain time unit and automatically change the picture control value to an initial value corresponding to a relevant picture control mode.

For example, when the preset-set picture control mode is an initial mode (i.e., one of the first through fourth picture control modes) and an initial value of luminance corresponding to the present-set picture control mode is 80, if a user changes the luminance value to 70, the picture controller 130 maintains the luminance value as 70 for a certain amount of time and then changes the luminance value back to 80.

In detail, the first control mode sets the picture control value to display an image with an optimal image quality. The picture control value corresponding to the first control mode is set at the time of manufacturing the apparatus. The second control mode sets the picture control value to display an image with a basic image quality. The third control mode sets the picture control value to correspond to the kind of image. The fourth control mode arbitrarily sets an image quality by a user.

The fifth through eighth control modes correspond to the first through fourth control modes, respectively. In detail, the first and fifth control modes have the same initial value of the picture control values, the second and sixth control modes have the same initial value of the picture control values, the third and seventh control modes have the same initial value of the picture control values, and the fourth and eighth control modes have the same initial value of the picture control values. However, the fifth through eighth control modes maintain picture control values, which are changed to values different from the first through fourth control modes.

The OSD processor 135 generates an OSD signal to output an OSD menu under the control of the controller 155 and provides the OSD signal to the image display 140. When the picture control mode is changed, the OSD processor 135 generates a picture control message to provide a notice of the changed picture control mode to the image display 140. The OSD processor 135 provides the picture control menu for a user to directly input the picture control value. The picture control menu may be generated through the OSD menu or provided in a separate menu screen.

The image display 140 displays an image in response to the image signal received from the image signal processor 125. The image display 140 displays an image, a quality of which is adjusted by the picture controller 130. The image display 140 receives an OSD signal from the OSD processor 135 to display OSD letters.

The input part 145 has buttons to generate input signals. Other input methods in addition to buttons may also be used, for example a keypad, a dial, or other such input method. Moreover, the input part 145 may be implemented as a receiver for receiving input commands from a remote device, such as a television (TV) remote control device. When a certain button is selected by a user, the input part 145 generates an input signal in response to the selected button and provides the input signal to the controller 155. The input signal may be a channel change request for the input channel of the tuner 105, a control request for audio output volume of the audio output part 120, a picture control set request to set the picture control value using the picture control menu, and a mode set request to set the picture control mode. It should be noted that these requests are only illustrative, and other requests and operations may also be performed by the input part. The controller 155 recognizes the mode set request when a certain button such as a menu button is pressed for a certain time, which may be predetermined, or when a combination of certain buttons is sequentially pressed.

The memory 150 stores data necessary for driving the image processing apparatus 100. Especially, the memory 150 stores an initial value of a picture control value in response to at least one picture control mode.

The controller 155 outputs control signals to control the tuner 105, the picture controller 130, the OSD processor 135, and the memory 150 in response to the input signals received from the input part 145. The controller 155 senses the change of the picture control value by a user's input and controls the picture controller 130 to automatically change the picture control value to the previously unchanged value.

The controller 155 may be set to recognize the mode included in the initial mode as a picture control mode only when a certain button of the input part 145 is pressed over a certain time, which may be predetermined. The controller 155 may be set to maintain the changed picture control mode although a time unit passes only when the present picture control mode is included in the initial mode and a certain button of the input part 145 is pressed for a certain time, which may be predetermined, to change the picture control mode.

As described above, the image processing apparatus 100 automatically restores the picture control value that is changed by a user when the present picture control mode is set to maintain the initial value of the picture control value. Accordingly, the image processing apparatus 100 can always maintain a certain picture control mode. Especially, when the image processing apparatus 100 is displayed in a place where a plurality of users exist such as a public place, the picture control value may be frequently changed by a plurality of unspecified users. In this case, the image processing device 100 may automatically restore the image quality in response to the present picture control mode so that the image processing device 100 can maintain the image quality adaptively for a user's request.

Hereinafter, the picture control method of the image processing apparatus 100 will be described with reference to FIGS. 2 through 4. At this time, a case is exemplified in which a mode to automatically convert the picture control mode into an initial value and a mode not to automatically convert the picture control mode into an initial value are mixed.

Figure 2:
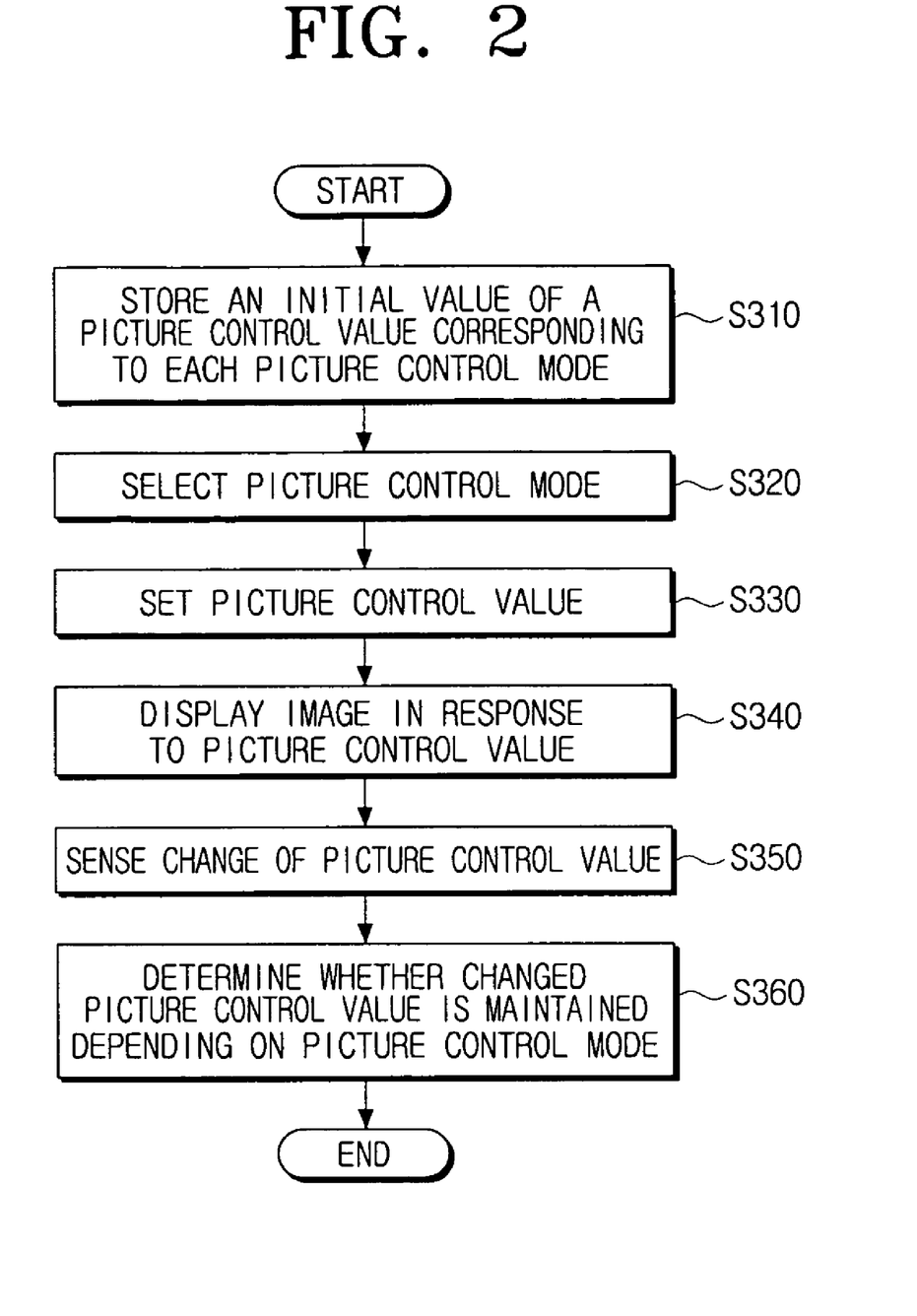
FIG. 2 is a flowchart for explaining a picture control method according to an exemplary embodiment of the present invention.

FIG. 2 is a flowchart of a picture control method according to an exemplary embodiment of the present invention.

Referring to FIGS. 1 and 2, the memory 150 stores an initial value of a picture control value in response to each picture control mode (S310).

When the controller 155 receives a mode set request from the input part 145, the mode set request being generated by a user's input operation, the picture controller 130 selects a picture control mode. In other words, the picture controller 130 sets a mode selected among the first through eighth control modes as a picture control mode under the control of the controller 155 (S320).

The OSD processor 135 provides a picture control message, which shows the set picture control mode, to the image display 140, and the image display 140 displays the picture control message.

The picture controller 130 then sets the picture control value in response to the set picture control mode (S330). The picture controller 130 initializes the picture control value in response to the set picture control mode.

The image display 140 displays an image with an image quality to correspond to the preset picture control value (S340).

The controller 155 senses whether the picture control value is changed by a user's operation (S350). The change may be to an arbitrary value.

When the picture control value is changed, the controller 155 determines whether to maintain the changed picture control value based on the present picture control mode, and sets the picture control value based on the determination result (S360). The process of determining whether the picture control value is reset will be described with reference to FIG. 3

Figure 3:
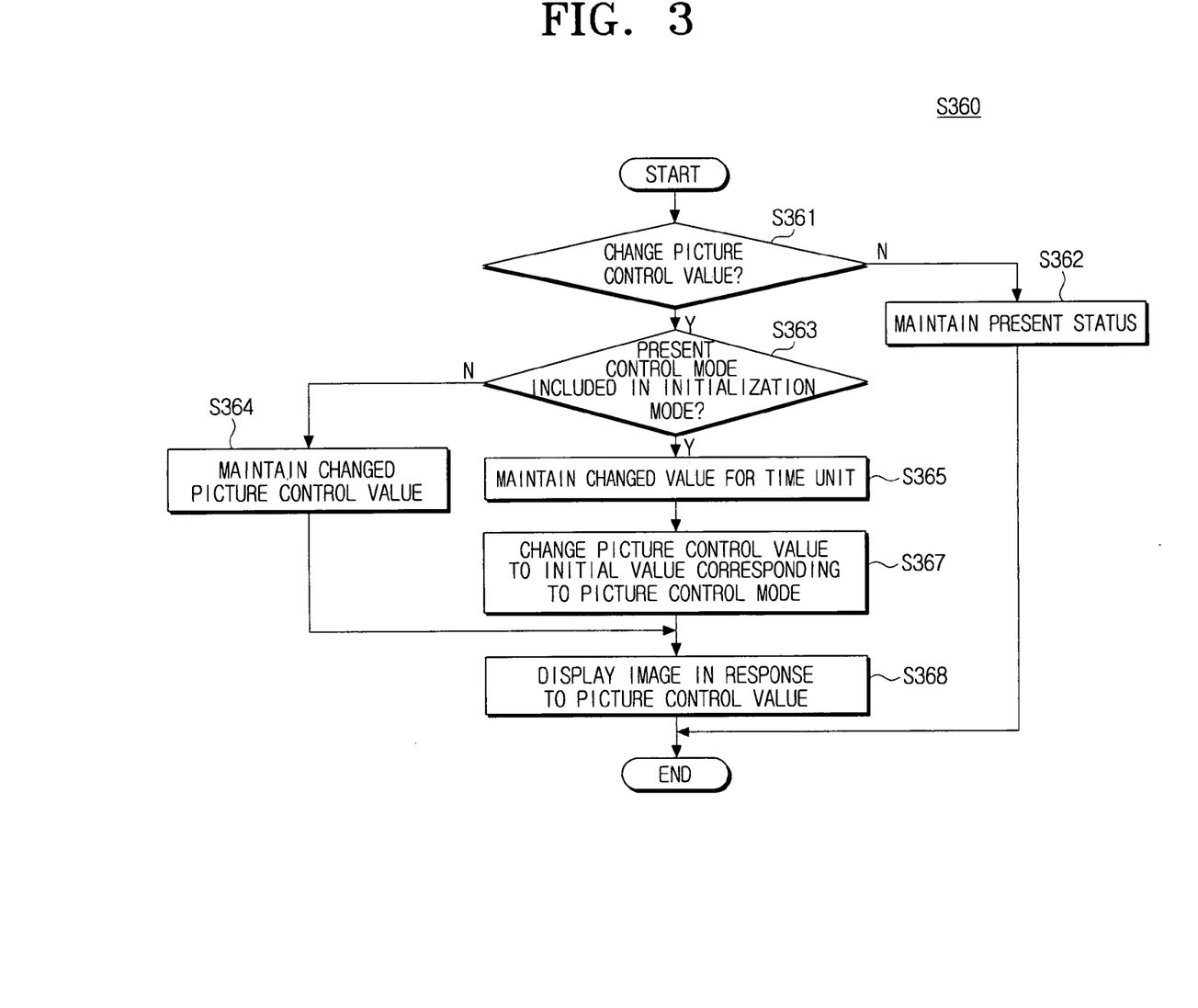
FIG. 3 is a flowchart for explaining a process of changing a picture control value, the setting of which is illustrated in FIG. 1.

FIG. 3 is a flowchart of a process of resetting the picture control value, the setting of which is illustrated in FIG. 2

Referring to FIGS. 1 and 3, the controller 155 determines whether the picture control value is changed by the input operation of a user (S361). In other words, the controller 155 determines whether the picture control value is identical with the initial value corresponding to the present picture control mode.

If it is determined in operation S361 that the picture control value is not changed, the picture controller 130 maintains the present status of the picture control value (S362).

If it is determined in operation S361 that the picture control value is changed, the controller 155 determines whether the present picture control mode is included in the initialization mode (S363). In other words, the controller 155 determines whether the present picture control mode is one of the first through fourth control modes.

If the present picture control mode is not included in the initialization mode in operation S363, the picture controller 130 maintains the changed picture control value (S364). In other words, if the picture control mode is one of the fifth through eighth control modes, the picture controller 130 maintains the changed picture control value.

However, if the preset picture control mode is included in the initialization mode in operation S363, the controller 155 controls the picture controller 130 to maintain the picture control value that is changed for a certain amount of time, i.e., a unit of time, from the time when the picture control value is changed (S365). The certain amount of time may be predetermined. The image display 140 accordingly displays an image with a quality corresponding to the changed picture control value for only the certain amount of time. For example, if the unit of time is set as 30 minutes, the image display 140 displays an image with the changed picture control value for 30 minutes from the time when the picture control value is changed.

If the changed picture control value is maintained in excess of the unit of time, the controller 155 controls the picture controller 130 to change the picture control value to the initial value corresponding to the present picture control mode so that the picture controller 130 restores the picture control value to the previously unchanged value (S367). The process of initializing the picture control value will be described with FIG. 4 below.

After operations S364 and S367, the image display 140 displays an image with a quality corresponding to the present picture control value (S368).

Figure 4:
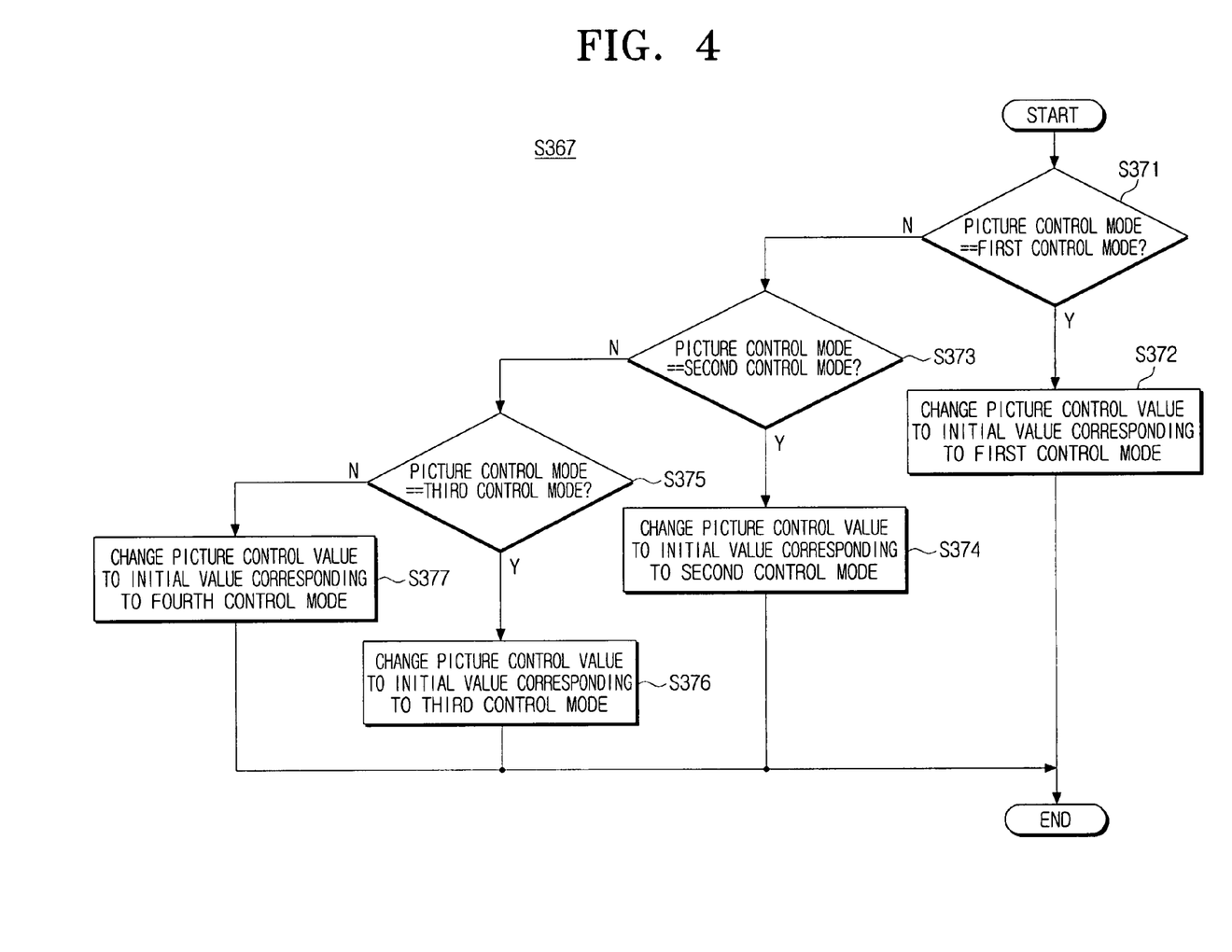
FIG. 4 is a flowchart for explaining a process of initializing the picture control value, which is illustrated in FIG. 3.

FIG. 4 is a flowchart of a process of initializing the picture control value, which is illustrated in FIG. 3

Referring to FIGS. 1 and 4, the controller 155 determines whether the present picture control mode is the first control mode (S371).

If it is determined that the picture control mode is the first control mode in the operation S371, the controller 155 detects the initial value of the picture control value, which corresponds to the first control mode, from the memory 150 and provides the value to the picture controller 130, and the picture controller 130 changes the picture control value to the initial value corresponding to the first control mode (S372).

If the picture control mode is not the first control mode in operation S371, the controller 155 determines whether the picture control mode is the second control mode (S373).

If it is determined that the picture control mode is the second control mode in the operation S373, the controller 155 detects the initial value of the picture control value, which corresponds to the second control mode, from the memory 150 and provides the value to the picture controller 130, and the picture controller 130 changes the picture control value to the initial value corresponding to the second control mode (S374).

If it is determined that the picture control mode is not the second control mode in the operation S373, the controller 155 determines if the picture control mode is the third control mode (S375).

If it is determined that the picture control mode is the third control mode in the operation S375, the controller 155 detects the initial value of the picture control value, which corresponds to the third control mode, from the memory 150 and provides the value to the picture controller 130, and the picture controller 130 changes the picture control value to the initial value corresponding to the third control mode (S376).

If it is determined that the picture control mode is not the third control mode in the operation S375, the controller 155 detects the initial value of the picture control value, which corresponds to the fourth control mode, from the memory 150 and provides the value to the picture controller 130, and the picture controller 130 changes the picture control value to the initial value corresponding to the fourth control mode (S377).

The image processing apparatus 100 maintains the initial value of the picture control value depending on the picture control mode and automatically initializes the changed picture control value in response to the picture control mode. Accordingly, the image processing apparatus 100 can maintain a certain image quality in response to the request of user. Additionally, once the picture control mode is set, a user does not need to reset the picture control value whenever the picture control value is changed. Therefore, a user can view an image with a certain quality. Accordingly, the image processing apparatus 100 can increase the convenience for a user.

In the present exemplary embodiment, the picture control mode comprises the first through eighth picture control modes irrespective of whether the initial value is automatically restored. However, the picture control mode may comprise a main control mode to select whether the initial value is automatically restored and a sub control mode to select a quality of an image.

In the main and sub control mode configuration, the main control mode comprises a first main mode to automatically restore the picture control value to the initial value and a second main mode to maintain the value that is changed by an input of a user.

The sub control mode may comprise first through fourth sub modes, but the number of the sub modes may increase or decrease. The first sub mode sets the picture control value to display an image with an optimal quality. The picture control value corresponding to the first sub mode is set at a time of manufacturing the apparatus. The second sub mode sets the picture control value to display an image with a basic quality. The third sub mode sets the picture control value to correspond to the kinds of image. The fourth sub mode sets an image quality, which may be set arbitrarily, by a user.

Thus, the picture control mode comprises the main control mode and the sub control mode, and the picture controller 130 selects one main control mode and one sub control mode according to a user's request so that an image quality of the image display 140 can be set.

Hereinafter, a picture control method of an image processing apparatus 100 will be described with reference to FIG. 5. In the description below, a case is exemplified in which a picture control mode comprises a main control mode and a sub control mode.

Figure 5:
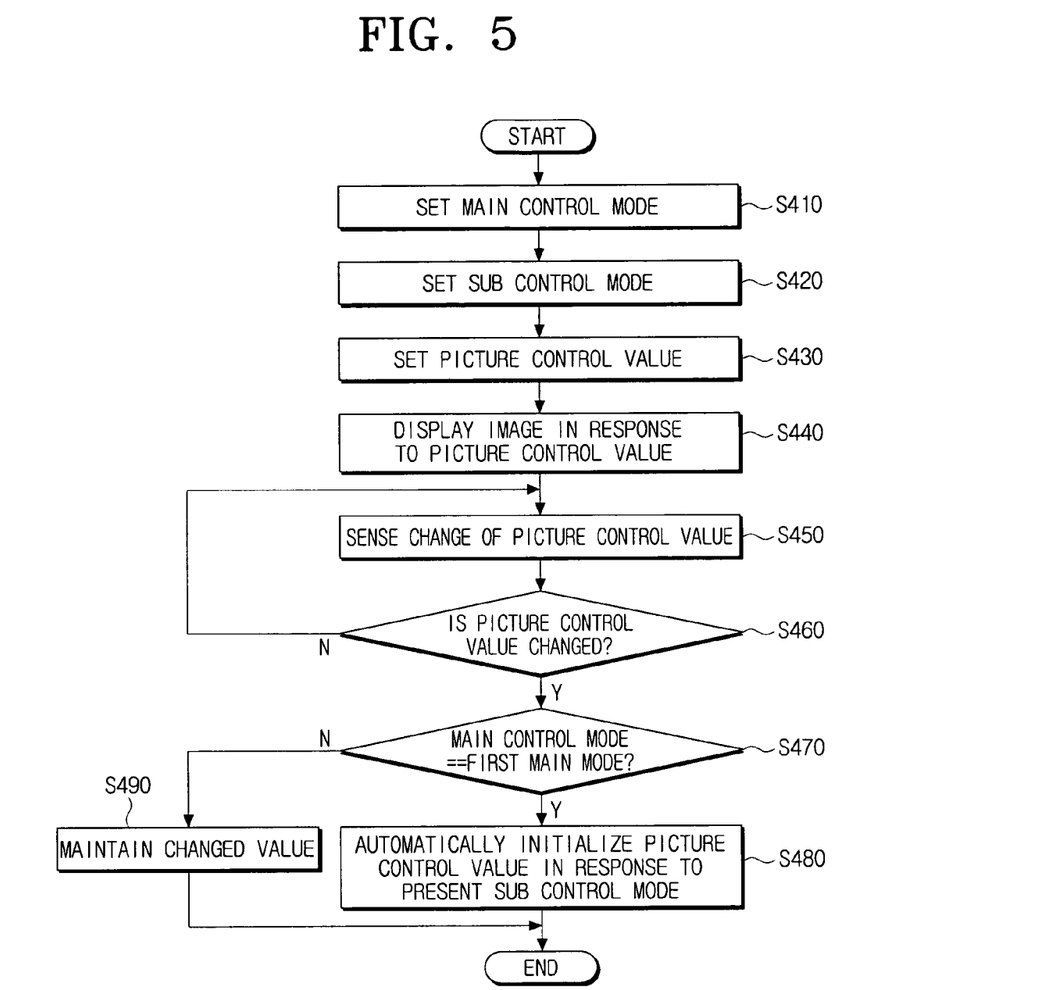
FIG. 5 is a flowchart for explaining a picture control method according to another exemplary embodiment of the present invention.

FIG. 5 is a flowchart of a picture control method according to another exemplary embodiment of the present invention.

Referring to FIGS. 1 and 5, when a request signal to select one of the first and second main modes by a user's operation is received from the input part 145, the controller 155 provides the selected main mode to the picture controller 130, and the picture controller 130 sets the selected main mode as the main control mode of the image processing apparatus 100 (operation S410). When a certain button of the input part 145 is pressed for a certain time, which may be predetermined, or a combination of certain buttons is sequentially pressed, the controller 155 recognizes that a request to set a main control mode is received.

When a request to set a sub control mode is received from the input part 145, the controller 155 provides the sub mode selected among the first through fourth sub modes to the picture controller 130, and the picture controller 130 sets the selected sub mode as a sub control mode of the image processing apparatus 100 (S420).

The picture controller 130 sets a picture control value corresponding to the set sub control mode (S430).

The image display 140 displays an image with a quality corresponding to the present-set sub control mode (S440).

The controller 155 senses whether the picture control value is changed by a user's input (S450). The change occur arbitrarily.

The controller 155 determines whether the picture control value is changed (S460), and if it is determined that the picture control value is not changed, the controller 155 maintains the present status (S450).

If it is determined that the picture control value is changed in the operation S460, the controller 155 determines whether the preset-set main control mode is the first main mode (S470).

If the main control mode is the first main mode in the operation S470, the controller 155 controls the picture controller 130 to maintain the changed picture control value for a certain amount of time, i.e., a certain time unit. If the changed picture control value is maintained in excess of the certain amount of time, the controller 155 detects the initial value of the picture control value, which corresponds to the present-set sub control mode, from the memory 150 to provide to the picture controller 130, and the picture controller 130 sets the received initial value as the picture control value (S480). Accordingly, the image processing apparatus 100 automatically restores the picture control value to the previously unchanged value.

If the main control mode is not the first main mode in the operation S470, the controller 155 controls the picture controller 130 to maintain the changed picture control value. Accordingly, the picture controller 130 maintains the changed picture control value, and the image display 140 displays an image with a quality corresponding to the changed picture control value (S490). Therefore, the image processing apparatus 100 maintains the changed picture control value even when the picture control value is maintained in excess of a certain amount of time from the time when the picture control value is changed.

In the present exemplary embodiment, the controller 155 senses the change of the picture control value and restores the changed picture control value. However, the controller 155 may also sense the change of the sub control mode and restore the changed sub control mode. In this case, if the sub control mode is changed when the main control mode is set as the first main mode, the controller 155 maintains the changed sub control mode for a certain amount of time and restores the changed sub control mode to the previously unchanged mode after the certain amount of time.

According to the above exemplary embodiments of the present invention, the image processing apparatus automatically restores the picture control value, which is changed depending on the picture control mode, to the previously unchanged value. Accordingly, the image processing apparatus can maintain a certain image quality in response to the request of user. Additionally, once a picture control mode is set, a user does not need to reset the picture control value whenever the picture control value is changed. Therefore, a user can view an image with a certain quality, and the image processing device can enhance the convenience for a user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A picture control method for an image processing device, the method comprising:
    setting a control mode of the image processing device;
    setting a picture control value to an initial value in response to the setting of the control mode;
    sensing a change of the picture control value from the initial value; and
    restoring the picture control value to the initial value if the change of the picture control value is maintained for a certain amount of time.

2. The method as claimed in claim 1, further comprising determining whether the control mode is set to restore an initial value of the picture control value, wherein the restoring of the picture control value to the initial value is performed if the change of the picture control value is maintained for a certain amount of time and if the control mode is set to restore the initial value.

3. The method as claimed in claim 1, wherein the picture control value is set to adjust a quality of the image in response to the control mode.

4. The method as claimed in claim 1, wherein setting the control mode comprises:
    setting a main control mode; and
    setting a sub control mode.

5. The method as claimed in claim 4, wherein the main control mode is set to determine whether the picture control value is to be restored to the initial value of the picture control value, and the sub control mode is set to set a quality of the image.

6. The method as claimed in claim 4, wherein the restoring the picture control value to the initial value comprises:
    setting the initial value according to the sub control mode.

7. The method as claimed in claim 4, wherein the initial value is set depending on a kind of the sub control mode.

8. The method as claimed in claim 4, further comprising:
    determining whether the main control mode is a first main mode, if the sub control mode is changed; and
    if the main control mode is the first main mode, changing the sub control mode to a previously unchanged mode, after the changed sub control mode is maintained in excess of the certain amount of time.

9. The method as claimed in claim 1, wherein the picture control value comprises at least one of a picture size, a contrast ratio, and a luminance.

10. The method as claimed in claim 1, wherein the initial value is set at a time of manufacturing of an apparatus.

11. An image processing apparatus comprising:
a memory which stores an initial value of a picture control value in response to a control mode; and
a controller which sets the control mode, sets the picture control value in response to the setting of the control mode, senses a change of the picture control value, retrieves the initial value from the memory, and restores the picture control value to the initial value.

12. The apparatus as claimed in claim 11, wherein the controller determines whether the control mode is to restore the picture control value to the initial value and if the control mode is to restore the picture control value to the initial value, the controller retrieves the initial value from the memory, and restores the picture control value to the initial value.

13. The apparatus as claimed in claim 12, wherein the picture control value is set to set a quality of the image.

14. The apparatus as claimed in claim 12, wherein in setting the control mode, the controller sets a main control mode and sets a sub control mode.

15. The apparatus as claimed in claim 14, wherein the main control mode is set to determine whether the picture control value is to be restored to the initial value of the picture control value, and the sub control mode is set to set a quality of the image.

16. The apparatus as claimed in claim 14, wherein in changing the picture control value to the initial value, the controller sets the initial value according to the sub control mode, if the picture control value is maintained in excess of the certain amount of time.

17. The apparatus as claimed in claim 14, wherein the memory stores the initial value of the picture control value in response to a kind of the control mode.

18. The apparatus as claimed in claim 14, wherein the controller:
senses whether the sub control mode is changed;
determines whether the present main control mode is a first main mode, if the sub control mode is changed;
maintains the changed sub control mode for the certain amount of time, if the main control mode is the first main mode;
changes the sub control mode to a previously unchanged mode, if the changed sub control mode is maintained in excess of the certain amount of time; and
maintains the changed control mode, if the main control mode is not the first main mode.

19. The apparatus as claimed in claim 12, wherein the picture control value comprises at least one of a picture size, a contrast ratio, and a luminance.

20. The apparatus as claimed in claim 12, wherein the initial value is set at a time of manufacturing of the apparatus.

21. The apparatus as claimed in claim 11, further comprising a display which displays an image in accordance with the picture control value.

22. A picture control method for an image processing device, the method comprising:
receiving a command to select one of a first mode and a second mode; and
controlling an apparatus to be operated according to the one of the first mode and the second mode, wherein the one of the first mode and the second mode is selected in response to the command,
wherein the first mode restores a picture control value to an initial value at a predetermined time after a user changes the picture control value, and the second mode maintains the changed picture control value after the user changes the picture control value.

23. The method as claimed in claim 22, wherein the first mode is set to maintain the changed picture control value for a certain amount of time if a user changes the picture control value, and to restore the changed picture control value to an initial value in excess of the certain amount of time.

24. The method as claimed in claim 22, wherein the first mode is used when an image processing apparatus is exhibited.

25. The method as claimed in claim 22, wherein the initial value is set at a time of manufacturing of an apparatus.

26. A picture control method for an image processing device, the method comprising:
determining whether a current mode is a first mode to restore a picture control value to an initial value or a second mode to maintain a picture control value changed by a user; and
controlling an apparatus to be operated according to the determined mode,
wherein the first mode restores the picture control value to the initial value at a predetermined time after the user changes the picture control value, and
the second mode maintains the changed picture control value if the user changes the picture control value.

27. A picture control method for an image processing device, the method comprising:
setting a control mode of the image processing device;
displaying on a display an image according to a picture control value of the set control mode;
receiving an input to change the picture control value;
displaying on the display an image in accordance with the changed picture control value; and
automatically displaying on the display the image in accordance with the picture control value of the set control mode in response to a certain amount of time passing after the receiving the input to change the picture control value.

28. The method as claimed in claim 27, further comprising determining whether the control mode is to restore the changed picture control value after a predetermined time, wherein the automatically displaying on the display is performed if the control mode is to restore the changed picture control value after the predetermined time and in response to a certain amount of time passing after the receiving the input to change the picture control value.

29. An image processing apparatus comprising:
a display which displays an image according to a picture control value;
a controller which sets a control mode of the image processing device, displays on the display an image in accordance with a picture control value of the set control mode, receives an input to change the picture control value, displays on the display an image in accordance with the changed picture control value, and automatically displays on the display an image in accordance with the picture control value of the set control mode in response to a certain amount of time passing after the receiving the input to change the picture control value.

30. The apparatus according to claim 29, wherein the controller determines whether the control mode is to restore the changed picture control value after a predetermined time, and if the control mode is to restore the changed picture control value after the predetermined time, the controller automatically displays on the display an image in accordance with the picture control value of the set control mode in response to a certain amount of time passing after the receiving the input to change the picture control value.

* * * * *